(12) United States Patent
Son et al.

(10) Patent No.: US 11,952,702 B2
(45) Date of Patent: Apr. 9, 2024

(54) LAUNDRY TREATING APPARATUS AND CONTROL METHOD FOR THE SAME

(71) Applicant: LG Electronics Inc., Seoul (KR)

(72) Inventors: Jinhwan Son, Seoul (KR); Changhun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 17/180,246

(22) Filed: Feb. 19, 2021

(65) Prior Publication Data

US 2021/0262139 A1     Aug. 26, 2021

(30) Foreign Application Priority Data

Feb. 21, 2020   (KR) .................... 10-2020-0021698

(51) Int. Cl.
| | | |
|---|---|---|
| D06F 34/28 | (2020.01) | |
| D06F 29/00 | (2006.01) | |
| D06F 34/08 | (2020.01) | |
| D06F 31/00 | (2006.01) | |
| D06F 33/42 | (2020.01) | |
| D06F 34/30 | (2020.01) | |

(Continued)

(52) U.S. Cl.
CPC ............. *D06F 34/28* (2020.02); *D06F 29/00* (2013.01); *D06F 34/08* (2020.02); *D06F 31/00* (2013.01); *D06F 33/42* (2020.02); *D06F 34/30* (2020.02); *D06F 34/32* (2020.02); *D06F 2105/08* (2020.02); *D06F 2105/46* (2020.02)

(58) Field of Classification Search
CPC ........... D06F 29/00; D06F 34/28; D06F 34/08
See application file for complete search history.

(56) References Cited

U.S. PATENT DOCUMENTS

| | | | | | |
|---|---|---|---|---|---|
| 5,698,826 | A | * | 12/1997 | Cracraft ................ | H01H 13/70 200/310 |
| 2003/0115682 | A1 | * | 6/2003 | Gardner ................ | D06F 29/005 68/12.27 |

(Continued)

FOREIGN PATENT DOCUMENTS

| | | |
|---|---|---|
| KR | 100652459 | 12/2006 |
| KR | 20110019082 | 2/2011 |

(Continued)

*Primary Examiner* — Joseph L. Perrin
*Assistant Examiner* — Kevin G Lee
(74) *Attorney, Agent, or Firm* — Fish & Richardson P.C.

(57) ABSTRACT

A laundry treating apparatus includes first and second treating apparatuses; a first display on which a control command that may be input to the first treating apparatus; a first apparatus input unit for inputting the control command to the first treating apparatus; a first display controller controlling the first display and the first apparatus input unit; a first apparatus first power circuit connecting the first display controller and the first apparatus input unit to a power source; a first apparatus second power circuit connecting the power source with the first load controller, switched by a first controller switch; and a first apparatus third power circuit connecting the power source with the first driving unit, switched by a first load portion switch. When the control command is input through the first apparatus input unit, the first display controller controls the first controller switch to close the first apparatus second power circuit.

10 Claims, 6 Drawing Sheets

(51) Int. Cl.
    *D06F 34/32*       (2020.01)
    *D06F 105/08*     (2020.01)
    *D06F 105/46*     (2020.01)

(56) References Cited

U.S. PATENT DOCUMENTS

| | | | | |
|---|---|---|---|---|
| 2009/0025432 A1* | 1/2009 | Kim | .......................... | D06F 34/34 |
| | | | | 68/12.27 |
| 2011/0041258 A1* | 2/2011 | Ko | ............................ | D06F 33/30 |
| | | | | 68/9 |

FOREIGN PATENT DOCUMENTS

| | | |
|---|---|---|
| KR | 20180021433 | 3/2018 |
| KR | 20180072254 | 6/2018 |

\* cited by examiner

LAUNDRY TREATING APPARATUS AND CONTROL METHOD FOR THE SAME

CROSS-REFERENCE TO RELATED APPLICATION

This application claims the benefit of the Korean Patent Application No. 10-2020-0021698, filed on Feb. 21, 2020, which is hereby incorporated by reference as if fully set forth herein.

TECHNICAL FIELD

The present disclosure relates to a laundry treating apparatus and a control method for the same.

BACKGROUND

A laundry treating apparatus collectively refers to a laundry washing apparatus, a laundry drying apparatus, and a laundry washing and drying apparatus.

A laundry treating apparatus of the related art is provided to include a dryer for drying laundry, a washing machine for washing laundry, and a rack for providing a space where any one of the dryer and the washing machine may be located on the other one. The laundry treating apparatus in which the dryer and the washing machine are stacked on the rack up and down has an advantage in that a user may easily move washed laundry from the washing machine to the dryer.

However, such a laundry treating apparatus of the related art needs a separate rack to position any one of the dryer and the washing machine on the other one, and in this case, a problem occurs in that a manufacturing cost is increased due to a large volume of the rack.

Also, since the aforementioned rack provides only a space where any one of the washing machine and the dryer can be located on the other one, a problem occurs in that the rack fails to serve as a means for forming unity in design of the washing machine and the dryer.

Also, in the aforementioned laundry treating apparatus of the related art, since a controller provided in the dryer and a controller provided in the washing machine operate by their respective circuits independent from each other, a problem occurs in that one device fails to control another device. Therefore, when any one of the washing machine and the dryer operates completely, a problem occurs in that a user should directly perform a process of supplying a power to the other one and a process of inputting a control command.

SUMMARY

Accordingly, the present disclosure is directed to a laundry treating apparatus and a control method for the same, which substantially obviate one or more problems due to limitations and disadvantages of the related art.

An object of the present disclosure is to provide a laundry treating apparatus provided with a fastening unit for connecting two treating apparatuses capable of washing and drying laundry.

Another object of the present disclosure is to provide a laundry treating apparatus provided with a fastening unit that facilitates movement of two treating apparatuses.

Still another object of the present disclosure is to provide a laundry treating apparatus provided with a fastening unit that forms unity in design of two treating apparatuses.

Further still another object of the present disclosure is to provide a laundry treating apparatus and a control method for the same, which may minimize a consumption amount of a standby power.

Further still another object of the present disclosure is to provide a laundry treating apparatus and a control method for the same, in which one of two treating apparatuses capable of washing and drying laundry may control the other one.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages, particular implementations of the present disclosure provide a laundry treating system that includes a first treating apparatus, a second treating apparatus, a first display, a first apparatus input controller, a first display controller, a first apparatus first power circuit, a first apparatus second power circuit, and a first apparatus third power circuit. The first treating apparatus may include (i) a first cabinet, (ii) a first container configured to rotate in the first cabinet and receive laundry therein, and (iii) a first driver configured to rotate the first container in accordance with a first control signal of a first load controller. The second treating apparatus may include (i) a second cabinet having an upper panel that supports the first cabinet, (ii) a second container configured to rotate in the second cabinet and receive laundry therein, and (iii) a second driver configured to rotate the second container in accordance with a second control signal of a second load controller. The first display may be configured to receive an input of a first control command for the first treating apparatus. The first apparatus input controller may be configured to input the first control command to the first treating apparatus. The first display controller may be configured to control the first display and the first apparatus input controller. The first apparatus first power circuit may be configured to connect the first display controller and the first apparatus input controller to at least one power source. The first apparatus second power circuit may be configured to connect the at least one power source with the first load controller based on a switching operation by a first controller switch. The first apparatus third power circuit may be configured to connect the at least one power source with the first driver based on a switching operation by a first load portion switch. The first display controller may be configured to, based on the first control command being input through the first apparatus input controller, control the first controller switch to close the first apparatus second power circuit.

In some implementations, the system can optionally include one or more of the following features. The first load controller may be configured to, based on the first apparatus second power circuit being closed, control the first load portion switch to close the first apparatus third power circuit. The laundry treating system may include a second display, a second apparatus input controller, a second display controller, a second apparatus first power circuit, a second apparatus second power circuit, and a second apparatus third power circuit. The second display may be configured to receive a second control command for the second treating apparatus. The second apparatus input controller may be configured to input the second control command to the second treating apparatus. The second display controller may be configured to control the second display and the second apparatus input controller. The second apparatus first power circuit may be configured to connect the second display controller and the second apparatus input controller to the at least one power source. The second apparatus second power circuit may be configured to connect the at least one power source with the second load controller based on a switching operation by a second controller switch. The second apparatus third power circuit may be configured to connect the at least one power source with the second driver based on a switching operation by a second load portion switch. The second display controller may be configured to, based on the second control command being input through the second apparatus input controller, control the second controller switch to close the second apparatus second power circuit. The second load controller may be configured to, based on the second apparatus second power circuit being closed, control the second load portion switch to close the second apparatus third power circuit. The first display controller and the second display controller may be configured to communicate with each other. The second display controller may be configured to, based on the first control command being received from the first display controller, control the second controller switch to close the second apparatus second power circuit. The first display controller may be configured to, based on the second control command being received from the second display controller, control the first controller switch to close the first apparatus second power circuit. The first apparatus input controller may be configured to input a first request for power supply to the first driver, and wherein the second apparatus input controller is configured to input a second request for power supply to the second driver. The laundry treating system may include a control panel fixed to at least one of the first cabinet or the second cabinet. The control panel may include the first display, the first apparatus input controller, the second display and the second apparatus input controller. The laundry treating system may include a first apparatus second input controller, a first apparatus lamp, a second apparatus second input controller, and a second apparatus lamp. The first apparatus second input controller may be positioned at the control panel and configured to receive a control command from a user. The first apparatus lamp may be positioned at the control panel and configured to emit light through the first apparatus second input controller to thereby make a position of the first apparatus second input controller recognizable by the user. The second apparatus second input controller may be positioned at the control panel and configured to receive a control command from the user. The second apparatus lamp may be positioned at the control panel and configured to emit light through the second apparatus second input controller to thereby make a position of the second apparatus second input controller recognized by the user. The first apparatus lamp may be configured to be turned on based on the first apparatus second power circuit and the first apparatus third power circuit being closed. The second apparatus lamp may be configured to be turned on based on the second apparatus second power circuit and the second apparatus third power circuit being closed. The first cabinet may include a first front panel that defines a first inlet being communicated with the first container. The second cabinet may include a second front panel that defines a second inlet being communicated with the second container. The second front panel may face a same direction as the first front panel. The control panel may be fixed to the first front panel. The laundry treating system may include a panel accommodating groove that accommodates the control panel that is positioned at a lower end of the first front panel. The first display may be configured to display a first control command input to the first treating apparatus. The second display may be configured to display a second control command input to the second treating apparatus.

Particular implementations of the present disclosure provide a control method for a laundry treating system. The laundry treating system may include a first treating apparatus, a first display, a first apparatus input controller, a second treating apparatus, a second display, and a second apparatus input controller. The first treating apparatus may include (i) a first drum rotatable in a first cabinet and configured to receive laundry therein, (ii) a first driver configured to rotate the first drum, (iii) a duct configured to guide air from the first drum, (iv) a heat exchanger configured to dehumidify and heat air entering the duct, and (v) a first load controller configured to control the first driver and the heat exchanger. The first display may be configured to receive a first control command for the first treating apparatus. The first apparatus input controller may be configured to input the first control command to the first treating apparatus. The second treating apparatus may include (i) a second cabinet that supports a lower surface of the first cabinet, (ii) a tub provided in the second cabinet and configured to receive water therein, (iii) a second drum rotatable in the tub and configured to receive laundry, (iv) a second driver configured to rotate the second drum, (v) a drainage pump configured to discharge water from the tub and the heat exchanger to outside of the second cabinet, and (vi) a second load controller configured to control the second driver and the drainage pump. The second display may be configured to receive a second control command for the second treating apparatus. The second apparatus input controller may be configured to input the second control command to the second treating apparatus. The control method may include supplying power to a first display controller to thereby cause the first display controller to control the first display and the first apparatus input controller through a first apparatus first power circuit that is connected to at least one power source; supplying power to a second display controller to thereby cause the second display controller to control the second display and the second apparatus input controller through a second apparatus first power circuit that is connected to the at least one power source; based on the first control command being input through the first apparatus input controller, supplying power to the first load controller by closing the first apparatus second power circuit by the first display controller; and based on the first apparatus second power circuit being closed, supplying power to the first driver and the heat exchanger by closing a first apparatus third power circuit by the first load controller.

In some implementations, the control method can optionally include one or more of the following features. The control method may include, based on the control command being input through the second apparatus input controller, supplying power to the second load controller by closing the second apparatus second power circuit by the second display controller; and based on the second apparatus second power circuit being closed, supplying power to the second driver and the drainage pump by closing a second apparatus third power circuit by the second load controller. The first display controller may be configured to, based on the first display controller receiving a control signal from the second display controller through a communication circuit, close the first apparatus second power circuit. The second display controller may be configured to, based on the second display controller receiving a control signal from the first display controller through a communication circuit, close the second apparatus second power circuit. The control method may include operating the first driver and the heat exchanger in accordance with the first control command input through the first apparatus input controller; transmitting a control signal to the second display controller by the first display controller through the communication circuit based on the operating the first driver and the heat exchanger being completed; and operating the drainage pump by the second load controller based on the second display controller receiving the control signal from the first display controller. The control method may include resuming supply of power to the second display controller based on the operating the drainage pump by the second load controller being completed, and resuming supply of power to the first display controller based on (i) the condensed water drainage step being completed or (ii) the course execution step being completed. The first display may be configured to display a first control command input to the first treating apparatus. The second display may be configured to display a second control command input to the second treating apparatus.

To achieve these objects and other advantages and in accordance with the purpose of the disclosure, as embodied and broadly described herein, a laundry treating apparatus according to the present disclosure comprises a first treating apparatus including a first cabinet, a first accommodating unit rotatably provided in the first cabinet, providing a space in which laundry is stored, and a first driving unit rotating the first accommodating unit in accordance with a control signal of a first load controller; a second treating apparatus including a second cabinet having an upper panel for supporting the first cabinet, a second accommodating unit rotatably provided in the second cabinet, providing a space in which laundry is stored, and a second driving unit rotating the second accommodating unit in accordance with a control signal of a second load controller; a first display on which a control command that may be input to the first treating apparatus or a control command input to the first treating apparatus is displayed; a first apparatus input unit provided to input the control command to the first treating apparatus; a first display controller controlling the first display and the first apparatus input unit; a first apparatus first power circuit connecting the first display controller and the first apparatus input unit to a power source; a first apparatus second power circuit connecting the power source with the first load controller, switched by a first controller switch; and a first apparatus third power circuit connecting the power source with the first driving unit, switched by a first load portion switch.

When the control command is input through the first apparatus input unit, the first display controller may control the first controller switch to close the first apparatus second power circuit.

When the first apparatus second power circuit is closed, the first load controller may control the first load portion switch to close the first apparatus third power circuit.

The laundry treating apparatus may further comprise a second display on which a control command that may be input to the second treating apparatus or a control command input to the second treating apparatus is displayed; a second apparatus input unit provided to input the control command to the second treating apparatus; a second display controller controlling the second display and the second apparatus input unit; a second apparatus first power circuit connecting the second display controller and the second apparatus input unit to a power source; a second apparatus second power circuit connecting the power source with the second load controller, switched by a second controller switch; and a second apparatus third power circuit connecting the power source with the second driving unit, switched by a second load portion switch, wherein when the control command is input through the second apparatus input unit, the second display controller may control the second controller switch to close the second apparatus second power circuit.

When the second apparatus second power circuit is closed, the second load controller may control the second load portion switch to close the second apparatus third power circuit.

The laundry treating apparatus may further comprise a communication circuit connecting the first display controller with the second display controller to perform communication with each other.

When the control command is received from the first display controller, the second display controller may control the second controller switch to close the second apparatus second power circuit.

When the control command is received from the second display controller, the first display controller may control the first controller switch to close the first apparatus second power circuit.

The first apparatus input unit may be provided as an input means for inputting a control command for request of power supply to the first driving unit, and the second apparatus input unit may be provided as an input means for inputting a control command for request of power supply to the second driving unit.

The laundry treating apparatus may further comprise a control panel fixed to any one of the first cabinet and the second cabinet, and the first display, the first apparatus input unit, the second display and the second apparatus input unit may be provided in the control panel.

The laundry treating apparatus may further comprise a first apparatus second input unit provided on the control panel, receiving a control command from a user; a first apparatus lamp provided on the control panel, allowing a user to recognize a position of the first apparatus second input unit by emitting light passing through the first apparatus second input unit; a second apparatus second input unit provided on the control panel, receiving a control command from a user; and a second apparatus lamp provided on the control panel, allowing a user to recognize a position of the second apparatus second input unit by emitting light passing through the second apparatus second input unit, wherein the first apparatus lamp may be lighted when the first apparatus second power circuit and the first apparatus third power circuit are closed, and the second apparatus lamp may be lighted when the second apparatus second power circuit and the second apparatus third power circuit are closed.

When the first apparatus second power circuit is closed but the first apparatus third power circuit is opened, the first apparatus lamp may be provided so as not to be lighted.

When the second apparatus second power circuit is closed but the second apparatus third power circuit is opened, the second apparatus lamp may be provided so as not to be lighted.

The first cabinet may further include a first front panel provided with a first inlet communicated with the first accommodating unit, the second cabinet may further include a second front panel provided with a second inlet communicated with the second accommodating unit and provided in the same direction as a direction where the first front panel is arranged, and the control panel may be fixed to the first front panel.

The laundry treating apparatus may further comprise a panel accommodating groove providing a space in which the control panel provided on a lower end of the first front panel is accommodated.

In another aspect of the present disclosure, there is provided a control method for a laundry treating apparatus comprising a first treating apparatus including a first drum rotatably provided in a first cabinet, providing a space in which laundry is stored, a first driving unit rotating the first drum, a duct forming a path through which the air inside the first drum circulates, a heat exchanger sequentially performing dehumidification and heating of the air entering the duct, and a first load controller controlling the first driving unit and the heat exchanger; a first display on which a control command that may be input to the first treating apparatus or a control command input to the first treating apparatus is displayed; a first apparatus input unit provided to input the control command to the first treating apparatus; a second treating apparatus including a second cabinet provided to support a lower surface of the first cabinet, a tub provided inside the second cabinet, storing water therein, a second drum rotatably provided inside the tub, storing laundry, a second driving unit rotating the second drum, a drainage pump discharging water stored in the tub and water supplied from the heat exchanger to the outside of the second cabinet, and a second load controller controlling the second driving unit and the drainage pump; a second display on which a control command that may be input to the second treating apparatus or a control command input to the second treating apparatus is displayed; and a second apparatus input unit provided to input the control command to the second treating apparatus.

The control method for the laundry treating apparatus comprises a first standby mode step of supplying a power to the first display controller, which controls the first display and the first apparatus input unit, through a first apparatus first power circuit always connected to a power source; a second standby mode step of supplying a power to the second display controller, which controls the second display and the second apparatus input unit, through a second apparatus first power circuit always connected to a power source; a power supply step of supplying a power to the first load controller by closing the first apparatus second power circuit by the first display controller if the control command is input through the first apparatus input unit; and a power supply step of supplying a power to the first driving unit and the heat exchanger by closing the first apparatus third power circuit by the first load controller if the first apparatus second power circuit is closed.

The control method for the laundry treating apparatus may further comprise a step of supplying a power to the second load controller by closing the second apparatus second power circuit by the second display controller if the control command is input through the second apparatus input unit; and a step of supplying a power to the second driving unit and the drainage pump by closing the second apparatus third power circuit by the second load controller if the second apparatus second power circuit is closed.

The first display controller may close the first apparatus second power circuit if the first display controller receives a control signal from the second display controller through a communication circuit.

The second display controller may close the second apparatus second power circuit if the second display controller receives a control signal from the first display controller through a communication circuit.

The control method for the laundry treating apparatus may further comprise a course execution step of operating the first driving unit and the heat exchanger in accordance with the control command input through the first apparatus input unit; a communication step of transmitting a control signal to the second display controller by the first display controller through the communication circuit after the course execution step is completed; and a condensed water drainage step of operating the drainage pump by the second load controller when the second display controller receives the control signal from the first display controller.

The second standby mode step may be resumed after the condensed water drainage step is completed, and the first standby mode step may be resumed after the condensed water drainage step is completed or resumed after the course execution step is completed.

According to the present disclosure, a laundry treating apparatus provided with a fastening unit for connecting two treating apparatuses capable of washing and drying laundry may be provided.

Also, according to the present disclosure, a laundry treating apparatus provided with a fastening unit that facilitates movement of two treating apparatuses may be provided.

Also, according to the present disclosure, a laundry treating apparatus provided with a fastening unit that forms unity in design of two treating apparatuses may be provided.

Also, according to the present disclosure, a laundry treating apparatus and a control method for the same, which may minimize a consumption amount of a standby power, may be provided.

Also, according to the present disclosure, a laundry treating apparatus and a control method for the same may be provided, in which one of two treating apparatuses capable of washing and drying laundry may control the other one.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Meanwhile, elements or control method of apparatuses which will be described below are only intended to describe the embodiments of the present disclosure and are not intended to restrict the scope of the present disclosure. Wherever possible, the same reference numbers will be used throughout the drawings to refer to the same or like parts.

Figure 1:
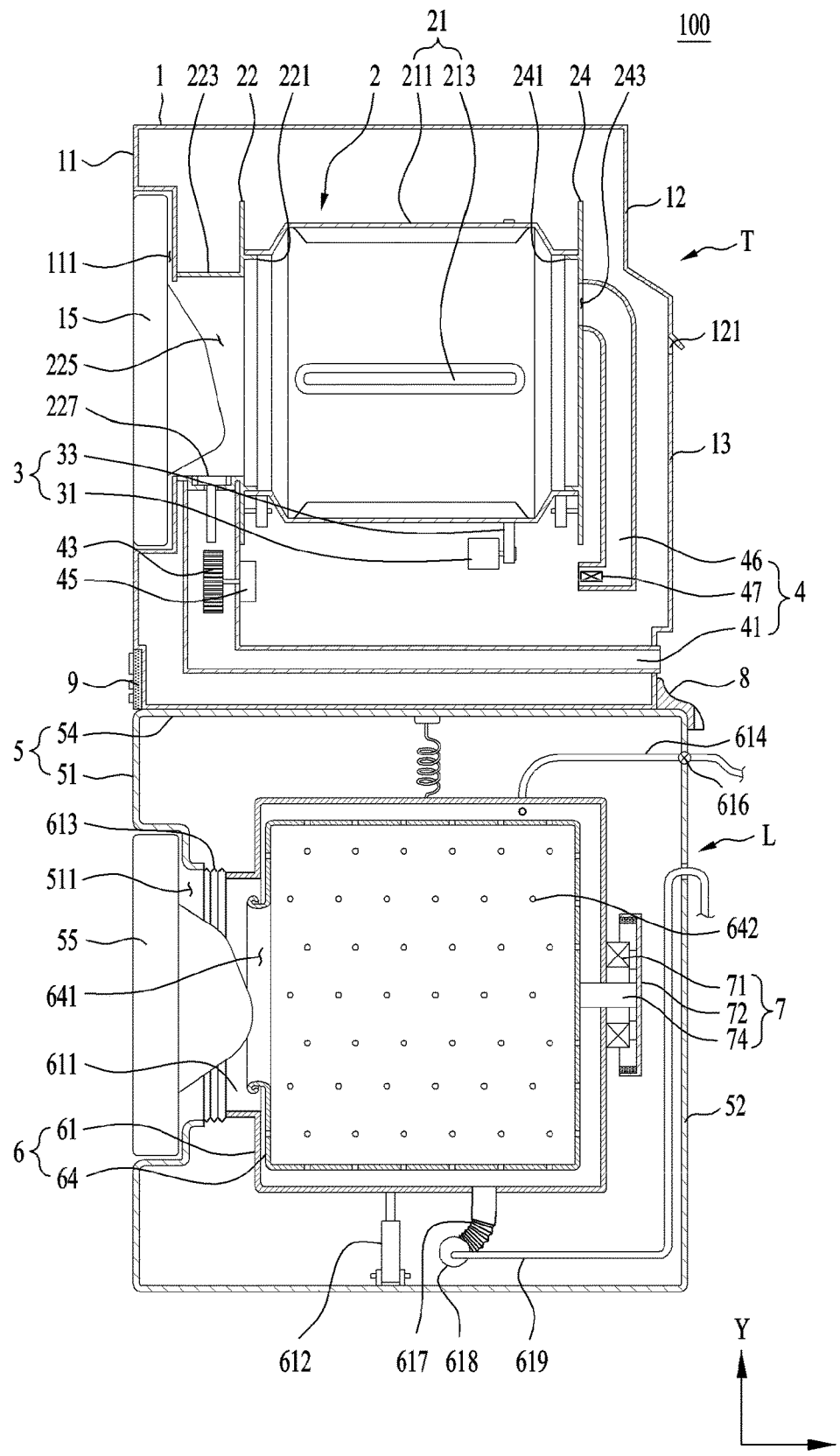
FIG. 1 illustrate an example of a laundry treating apparatus.

As shown in FIG. 1, the laundry treating apparatus 100 may be provided to include a first treating apparatus T for drying laundry and a second treating apparatus L provided to support a bottom surface of the first treating apparatus, thereby washing or drying laundry.

The first treating apparatus T includes a first cabinet 1, a first accommodating unit 2 rotatably provided in the first cabinet 1, providing a space in which laundry is stored, and a supply unit 4 supplying the heated air into the first accommodating unit 2.

The first cabinet 1 may be provided to include a front panel 11 (first front panel) forming a front surface of the first treating apparatus, a rear panel 12 (first rear panel) forming a rear surface of the first treating apparatus, an upper panel (first upper panel) forming an upper surface of the first treating apparatus, and a base panel supported on an upper surface of the second treating apparatus L.

The first front panel 11 is provided with a first inlet 111 provided to be communicated with the first accommodating unit 2, and the first inlet 111 may be provided to be opened or closed by a door 15 (first door) rotatably coupled to the first cabinet.

The first accommodating unit 2 may be provided as a drum 21 (first drum) rotatably provided in the first cabinet 1. If the first drum 21 is provided with a drum body 211 of a cylindrical shape of which front surface and rear surface are respectively opened, a front support 22 rotatably supporting the front surface of the drum body 211 and a rear support 24 rotatably supporting the rear surface of the drum body 211 may be provided inside the first cabinet 1.

The front support 22 may be provided to include a first fixed body fixed into the first cabinet 1, a first drum inlet 225 provided to pass through the first fixed body, communicating the first inlet 111 with the inside of the drum body 211, and a first support body 221 provided in the first fixed body and inserted into the front surface of the drum body 211.

The first fixed body may be provided even in any shape if it may be provided with the first drum inlet 225 and the first support body 221. The first support body 221 may be provided in a pipe shape protruded from the first fixed body toward the drum body 211, and its diameter may be set to be greater than that of the first drum inlet 225.

The front support 22 may be provided to be connected to the first inlet 111 through a connecting body 223. The connecting body 223 may be provided in a cylindrical shape to surround the first inlet 111. In this case, the first drum inlet 225 may be provided as a through hole connected to the first inlet 111 by passing through the connecting body 223.

An outlet communicated with the supply unit 4 may be provided in the connecting body 223. The outlet may be provided as a hole provided to pass through the connecting body 223, and a filter 227 may detachably be inserted into the outlet. The air inside the drum body 211 may move to the supply unit 4 through the outlet and the filter 227, and particles contained in the air in this process may be filtered by the filter 227.

The rear support 24 may be provided to include a second fixed body fixed into the first cabinet 1, and a second support body 241 provided in the second fixed body and inserted into the rear surface of the drum body 211. The rear support 24 is provided with a supply hole 243 provided to pass through the second fixed body, guiding the air supplied from the supply unit 4 to the drum body 211.

A lifter 213 for stirring of laundry may be provided on a circumferential surface of the drum body 211. The lifter 213 may be provided as a board protruded from the circumferential surface of the drum body 211 toward a rotation center of the drum body.

The drum body 211 is rotated by a first driving unit 3, and the first driving unit 3 may be provided to include a first motor 31 fixed into the first cabinet 1, a pulley rotated by the first motor, and a belt 33 connecting a circumferential surface of the pulley with the circumferential surface of the drum body 211.

The supply unit 4 may be provided to include ducts 41 and 46 and a heat exchanger 47 provided in the duct to exchange heat with the air. The ducts may be provided to include a discharge duct 41 guiding the air discharged from the drum body 211 to the outside of the first cabinet 1 through the outlet, and a supply duct 46 supplying the air to the inside of the drum body 21 through the supply hole 243.

The discharge duct 41 may be provided with fans 43 and 45, and the heat exchanger 47 may be provided as a heater for heating the air entering the supply duct 46. The fans may be provided to include an impeller 43 rotatably provided inside the discharge duct 41, and a fan motor 45 rotating the impeller if a power is supplied thereto.

One end of the supply duct 46 may be provided as a pipe having one end connected to the supply hole 243 and a free end arranged inside or outside the first cabinet 1. If the free end of the supply duct 46 is arranged inside the first cabinet 1, a through hole 121 may be provided in the first rear panel 12.

The second treating apparatus L may be provided to include a second cabinet 5 provided to support a bottom surface (base panel) of the first cabinet 1, and a second accommodating unit 6 provided inside the second cabinet, providing a space in which laundry is stored.

The second cabinet 5 may be provided to include a front panel 51 (second front panel) forming a front surface of the second treating apparatus L, a rear panel 52 (second rear panel) forming a rear surface of the second treating apparatus, and an upper panel 54 (second upper panel) forming an upper surface of the second treating apparatus, on which the first cabinet 1 is supported.

The second front panel 51 is provided with an inlet 511 (second inlet), and the second inlet 511 may be provided to be opened or closed by a door 55 (second door). If the second treating apparatus L is provided as an apparatus for washing laundry, the second accommodating unit 6 may be provided inside the second cabinet 5 to include a tub 61 for providing a space in which water is stored, and a drum 64 (second drum) rotatably provided inside the tub, storing laundry therein.

The tub 61 may be fixed to the second cabinet 6 through a tub support 612. A tub inlet 611 communicated to the second inlet 511 is provided on a front surface of the tub 61, and may be connected to the second inlet 511 through a gasket 613.

The tub 61 is supplied with water through a water supply unit, and is discharged to the outside of the second cabinet 5 through a drainage unit. The water supply unit may be provided to include a water supply pipe 614 connecting a water supply source with the tub 61, and a water supply valve 616 controlling switching of the water supply pipe. The drainage unit may be provided to include a first drainage pipe 617 guiding water inside the tub 61 to the drainage pump 618, and a second drainage pipe 619 guiding water discharged from the drainage pump 618 to the outside of the second cabinet 5.

The second drum 64 may be provided in a hollow cylindrical shape. A second drum inlet 641 communicated with the second inlet 511 through the tub inlet 611 may be provided on the front surface of the second drum, and a drum through hole 642 communicating the inside of the second drum with the inside of the tub may be provided on the circumferential surface and the rear surface of the second drum.

The second drum 64 may be rotated by a second driving unit 7. The second driving unit 7 may be provided to include a stator 71 fixed to the rear surface of the tub 61, forming a rotating magnetic field, a rotor 72 rotated by the rotating magnetic field, and a rotary shaft 74 connecting the rotor 72 with the rear surface of the second drum 64 by passing through the rear surface of the tub.

The first treating apparatus T and the second treating apparatus L may be connected with each other through a fastening unit 8. The fastening unit 8 is a mechanism for fixing the first treating apparatus T to the second treating apparatus L by connecting the first rear panel 12 with the second rear panel 52.

Figure 2:
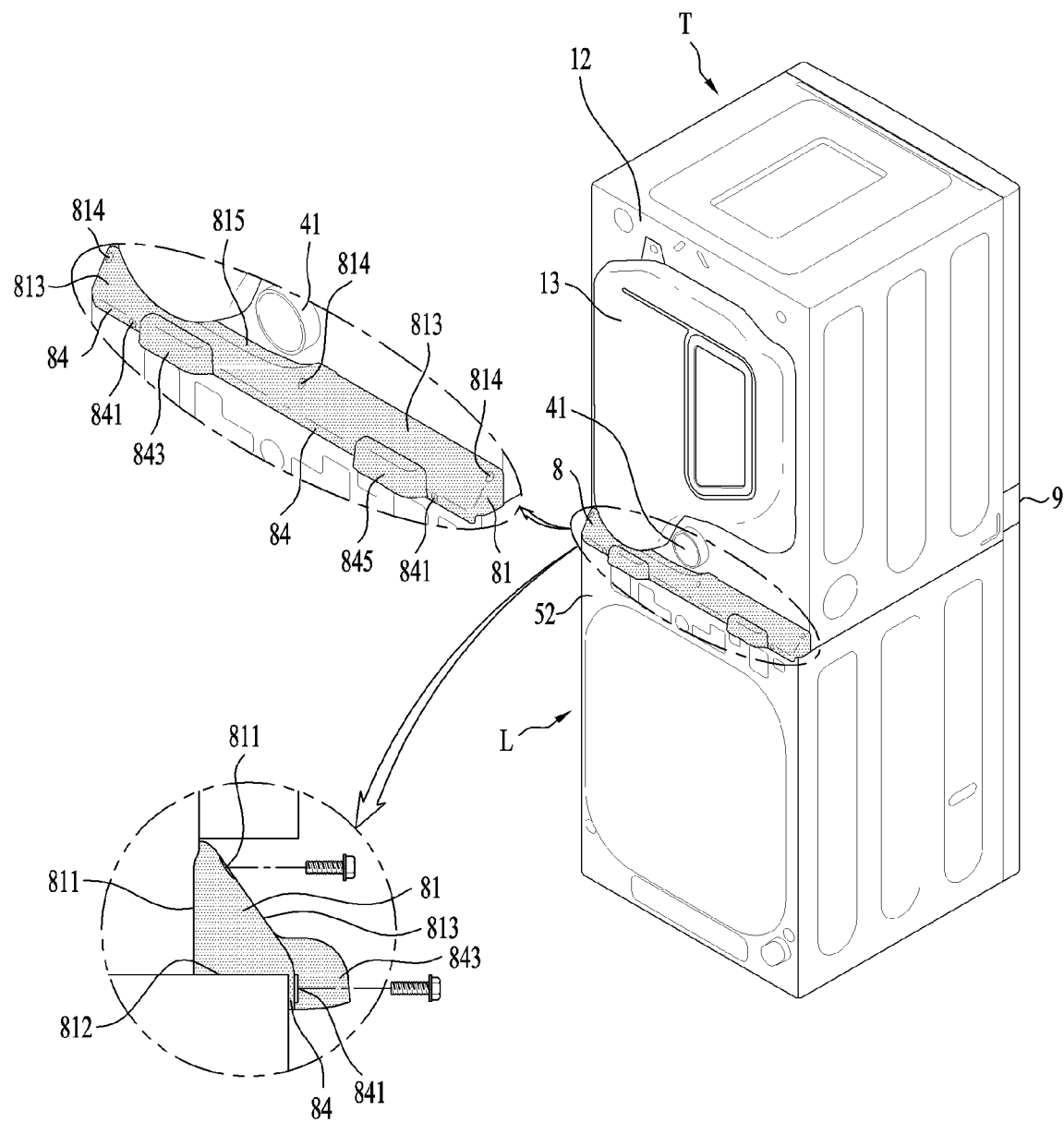
FIG. 2 illustrates an example of a fastening unit.

As shown in FIG. 2, the fastening unit 8 may be provided to include fastening bodies 81 and 84 having one end fixed to the first rear panel 12 and the other end fixed to the second rear panel 52 to connect the first cabinet with the second cabinet, and handles 843 and 845 provided in the fastening bodies to form a space for accommodating a user's hand.

The fastening bodies may be provided to include a first fastening body 81 fixed to the first rear panel 12 and a second fastening body 84 fixed to the second rear panel 52. The first fastening body 81 may be provided to include a first contact surface 811 which is in contact with the first rear panel 12, and a second contact surface 812 which is in contact with the second upper panel 54.

If a depth (length of the first cabinet in X-axis direction) of the first treating apparatus T is set to be shorter than a depth (length of the second cabinet in X-axis direction of the second treating apparatus L, the first fastening body 81 may further be provided with an inclined surface 813 connecting the first rear panel 12 with the second rear panel 52.

That is, if a distance from the first front panel 11 to the first rear panel 12 is set to be shorter than a distance from the second front panel 51 to the second rear panel 52, the inclined surface 813 may be provided to connect the first rear panel 12 with the second rear panel 52 such that a step difference formed between the two treating apparatuses may be prevented from exposed to the outside.

The inclined surface 813 may be provided as a plane or curved surface downwardly inclined from the first rear panel 12 toward the second rear panel 52, and FIG. 2 shows that the second inclined surface 813 is provided as a plane, as an example.

The second fastening body 84 may be provided as a board having one end fixed to the first fastening body 81 and the other end fixed to the second rear panel 52. In this case, the inclined surface 813 may be provided as a plane or curved surface for connecting an upper end of the first contact surface 811 with an upper end of the second fastening body 84.

The fastening unit 8 may be provided to include a first fastening hole 814 passing through the first fastening body 81, a second fastening hole 841 passing through the second fastening body 84, a first fixing unit (bolt, etc.) inserted into the first fastening hole 814 and then fixed to the first rear panel 12, and a second fixing unit (bolt, etc.) inserted into the second fastening hole 841 and then fixed to the second rear panel 52.

Since the aforementioned fastening bodies 81 and 84 are provided to connect the rear panels of the two treating apparatuses T and L, when the two treating apparatuses are stacked up and down, it does not affect design of the laundry treating apparatus. Also, even though the fastening unit 8 is exposed to a side of the laundry treating apparatus 100 which is provided indoor, unity in design may be obtained through the inclined surface 813.

The handle may be provided to include first and second handles 843 and 845 provided in the fastening bodies 81 and 84 and formed to be spaced apart from each other. The first handle 843 and the second handle 845 may be provided as protrusions protruded toward a direction far away from the fastening bodies 81 and 84, or may be provided as grooves formed as surfaces of the fastening bodies 81 and 84 are bent to be concave. Therefore, a worker for setting up the laundry treating apparatus or a user may easily set up the laundry treating apparatus or easily change a position of the laundry treating apparatus through the handles.

As shown in FIG. 1, the first rear panel 12 may further be provided with a duct accommodating unit 13 for preventing the supply duct 46 from interfering with the first rear panel 12. The duct accommodating unit 13 should be protruded to be far away from the first rear panel 12 and provided to form a space in which the supply duct 46 can be accommodated.

However, if the length of the duct accommodating unit 13 protruded from the first rear panel 12 becomes too long, a problem occurs in that a volume of a space required for setup of the laundry treating apparatus 100 is increased.

Therefore, it is preferable that the distance of the duct accommodating unit 13 protruded from the first rear panel 12 is set to a distance from the first rear panel 12 to the second rear panel 52 or less. That is, the duct accommodating unit 13 is preferably provided to be arranged between a vertical line (Y-axis direction straight line) passing through the center of the first rear panel 12 and a vertical line (Y-axis direction straight line) passing through the second rear panel 52.

In this case, a free end of the discharge duct 41 exposed to the outside of the first cabinet 1 by passing through the first rear panel 12 may be arranged between the duct accommodating unit 13 and the first fastening body 81. If the free end of the discharge duct 41 is arranged on the first fastening body 81, the first fastening body 81 may be provided with an anti-interference groove 815 that prevents the free end of the discharge duct 41 from interfering with the first fastening body 81. As shown in FIG. 2, the anti-interference groove 815 may be provided as a groove formed as the upper end of the first fastening body 81 is bent to be concave in a direction far away from the free end of the discharge duct 41.

Figure 3:
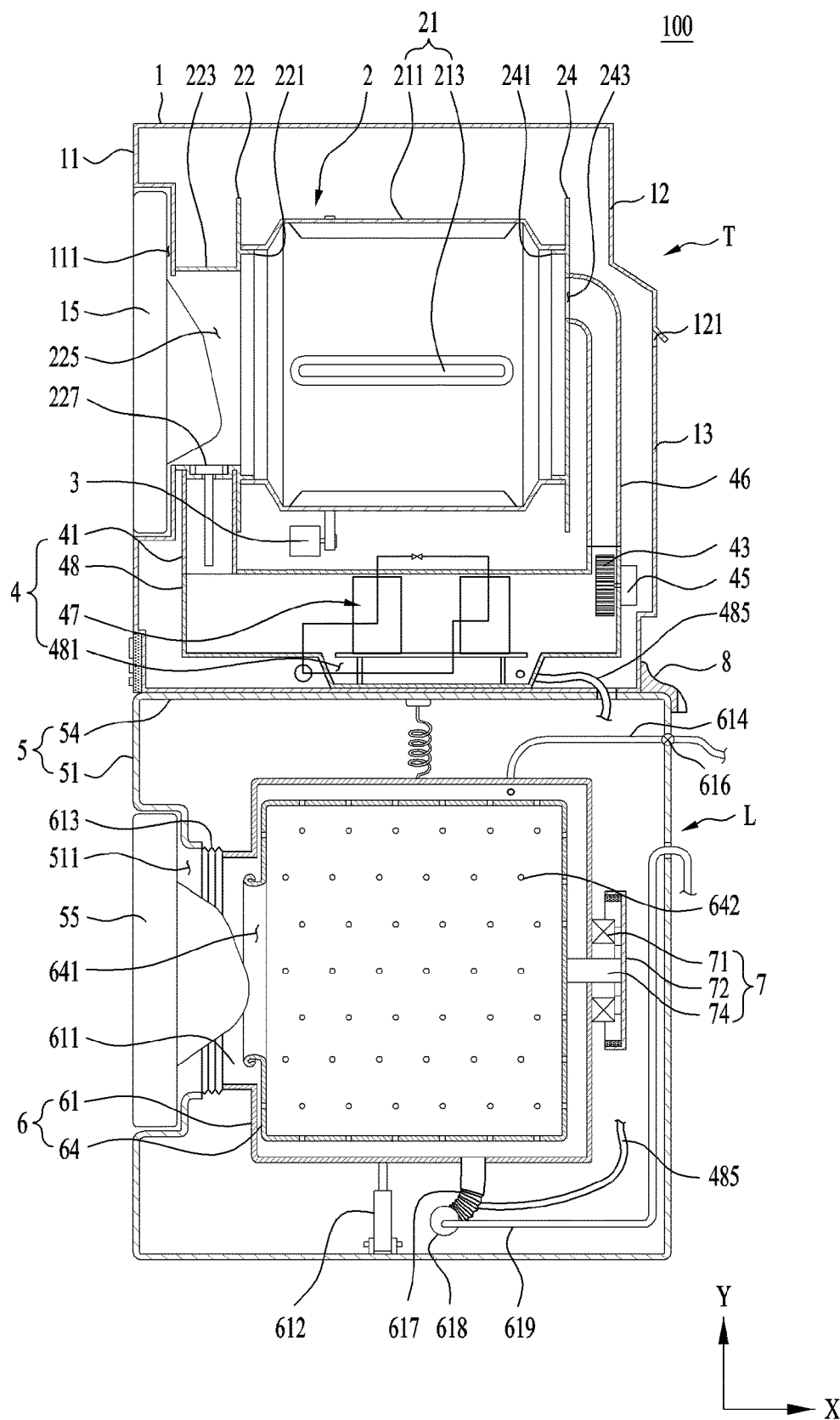
FIG. 3 illustrates another embodiment of a laundry treating apparatus.

FIG. 3 illustrates another embodiment of the laundry treating apparatus 100. The laundry treating apparatus according to this embodiment may also be provided to include a first treating apparatus T and a second treating apparatus L. The laundry treating apparatus of this embodiment may be provided in the same structure as that of the laundry treating apparatus shown in FIG. 1 except the structure of the supply unit 4 provided in the first treating apparatus.

The supply unit 4 shown in FIG. 3 may be provided to include ducts 41, 46 and 48 forming a path for re-supplying the air discharged from the first drum 21 to the drum 2, and a heat exchanger 47 dehumidifying and heating the air entering the ducts.

The ducts may be provided to include a discharge duct 41 connected to the outlet, a supply duct 46 connected to the supply hole 243, and a connection duct 48 connecting the discharge duct with the supply duct. The impeller 43 of the fan may rotatably be provided inside the connection duct 48.

Figure 4:
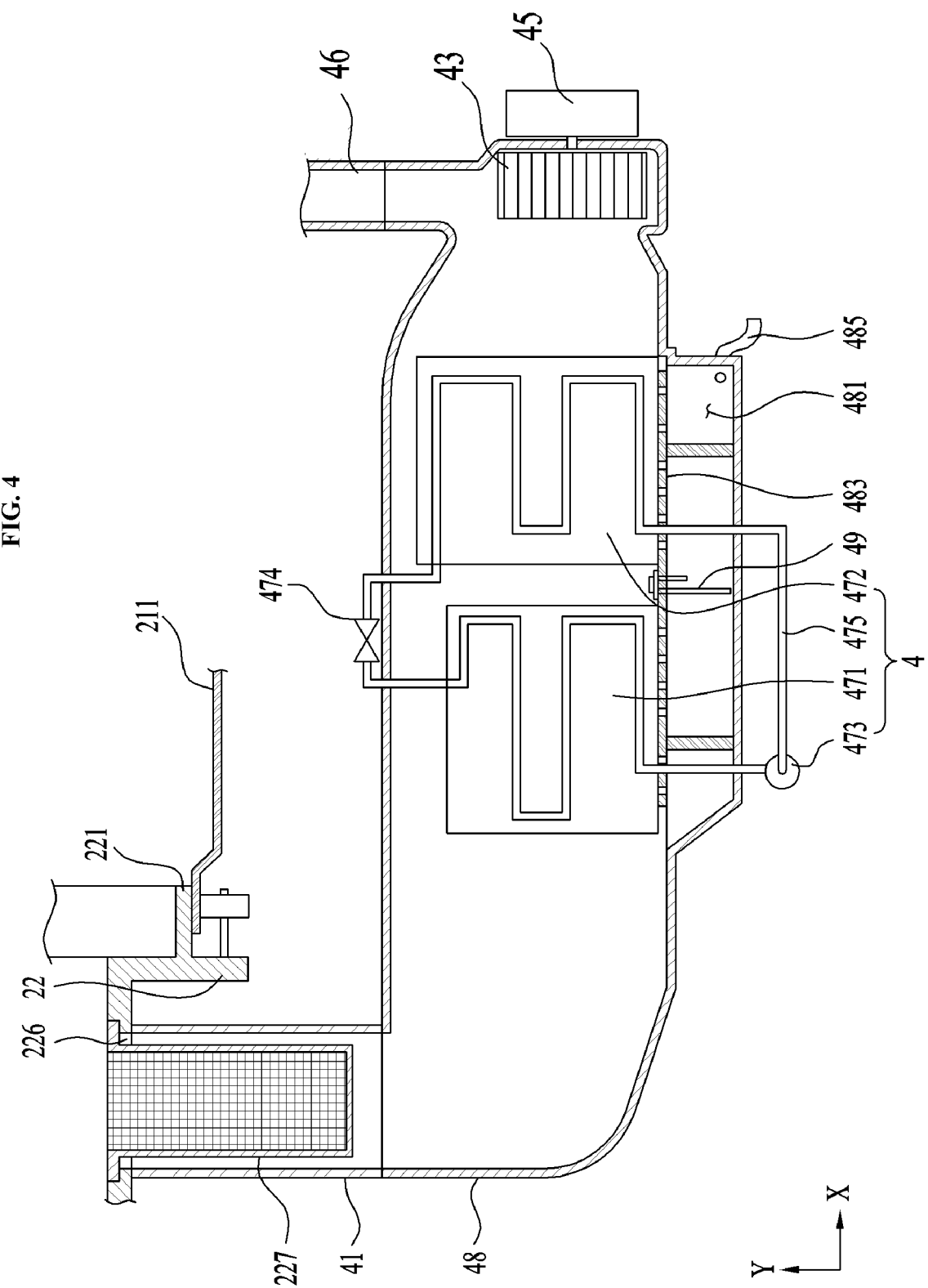
FIG. 4 illustrates an example of a heat exchanger.

As shown in FIG. 4, the heat exchanger 47 provided in this embodiment includes a first heat exchanger 471 (heat absorption unit) removing water from the air entering the connection duct 48, and a second heat exchanger 472 (heat emission unit) provided inside the connection duct 48, heating the air passing through the first heat exchanger 471. The heat absorption unit 471 and the heat emission unit 472 are sequentially disposed along a moving direction of the air and connected with each other through a refrigerant pipe 475 that forms a circulating path of a refrigerant.

The refrigerant moves along the refrigerant pipe 475 by means of a compressor 473 arranged outside the ducts 41, 46 and 48, and the refrigerant pipe 475 is provided with a pressure controller 474 for controlling a pressure of the refrigerant that has passed through the heat emission unit 472.

The heat absorption unit 471 is a means for cooling the air and evaporating the refrigerant by delivering heat of the air entering the discharge duct 41 to the refrigerant. The heat emission unit 472 is a means for heating the air and condensing the refrigerant by delivering heat owned by the refrigerant that has passed through the compressor 473 to the air. In this case, water contained in the air will be collected in the bottom surface of the connection duct 48 along the surface of the heat absorption unit 471 when passing through the heat absorption unit 471.

In order to collect water removed from the air passing through the heat absorption unit 471, the first treating apparatus T is provided with a water collecting body 481. The water collecting body 481 may be provided anywhere in the laundry treating apparatus, which can store water discharged from the heat absorption unit, and FIG. 4 illustrates that the water collecting body 481 is arranged inside the connection duct 48, as an example.

A heat exchanger support 483 may further be provided in the water collecting body 481 such that the heat absorption unit 471 and the heat emission unit 472 are not in contact with the water (condensed water) stored in the water collecting body 481. Also, a water level sensor 49 for measuring the amount of the collected water may further be provided in the water collecting body 481.

The water stored in the water collecting body 481 is discharge to the outside of the first treating apparatus T through a condensed water drainage pipe 485. The condensed water drainage pipe 485 may be provided such that one end is fixed to the water collecting body 481 and the other end is connected to a sewage unit provided in the space where the laundry treating apparatus 100 is set up.

As shown in FIG. 3, the condensed water drainage pipe 485 may be provided such that one end is connected to the water collecting body 481 and the other end is connected to the first drainage pipe 617 provided in the second treating apparatus. In this case, the condensed water drainage pipe 485 may be provided to connect the water collecting body 481 with the first drainage pipe 617 by passing through the base panel of the first treating apparatus T and the upper panel 54 of the second treating apparatus.

In the embodiments of FIG. 1 and FIG. 3, although the second treating apparatus L has been defined as an apparatus for washing of laundry, the second treating apparatus L may be provided as an apparatus for drying of laundry. In this case, the second treating apparatus L may be provided in the same structure as that of the first treating apparatus T shown in FIG. 1 or 3.

Figure 5:
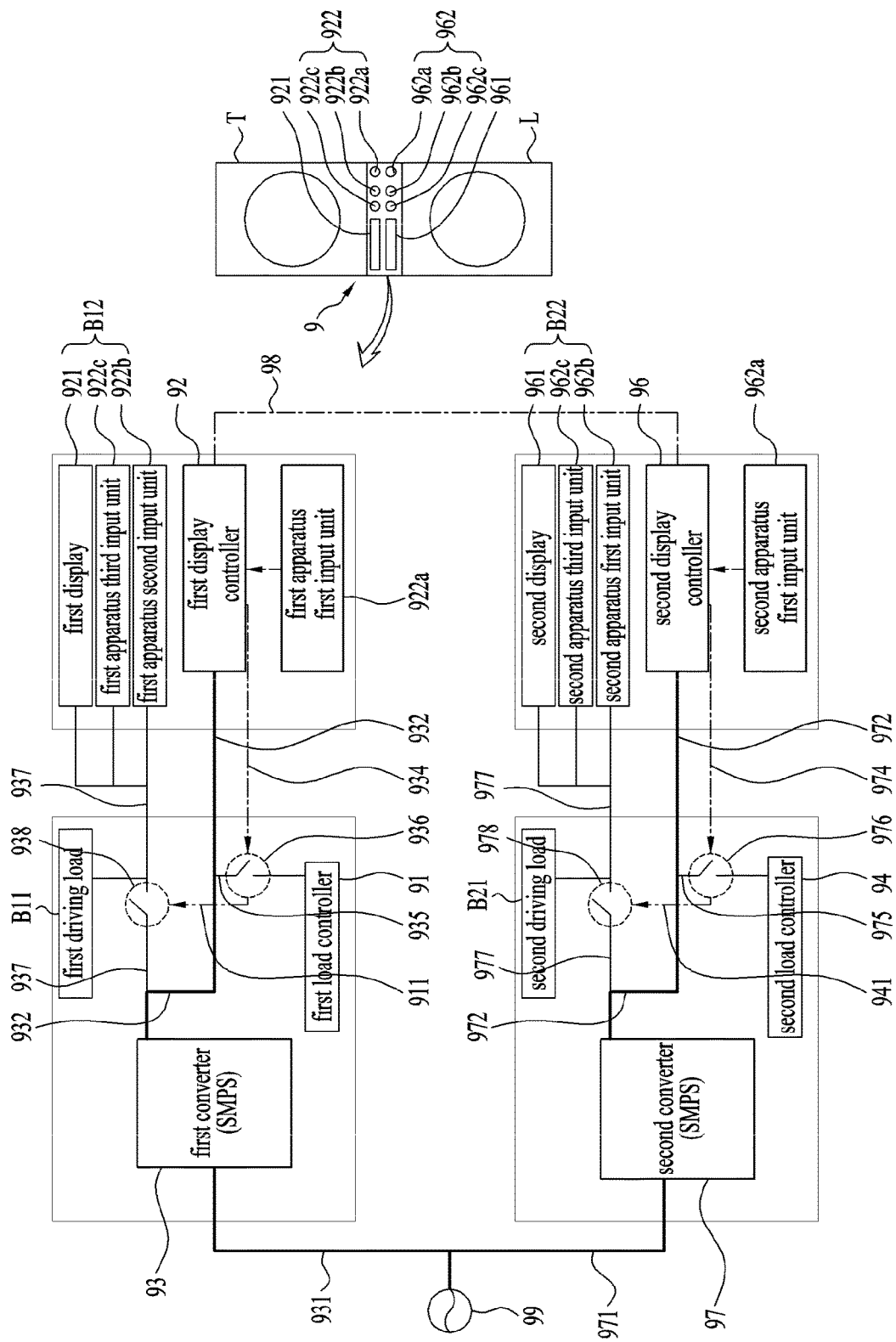
FIG. 5 illustrates an example of a control panel, a load controller and a display controller.

An input unit and a display unit, which are required for control of each of the treating apparatuses T and L, are provided in the laundry treating apparatus 100 shown in FIGS. 1 and 3. That is, as shown in FIG. 5, a first apparatus input unit 922 and a first display 921 are provided in the first treating apparatus T, and a second apparatus input unit 962 and a second display 961 are provided in the second treating apparatus L.

The first display 921 is a means for displaying a control command, which can be input to the first treating apparatus T, or a control command input to the first treating apparatus, and the first apparatus input unit 922 is a means for inputting the control command to the first treating apparatus T. Likewise, the second display 961 is a means for displaying a control command, which can be input to the second treating apparatus L, or a control command input to the second treating apparatus, and the second apparatus input unit 962 is a means for inputting the control command to the second treating apparatus L.

In order to form unity in design of the laundry treating apparatus 100 in which two treating apparatuses are arranged up and down, the first apparatus input unit 922, the first display 921, the second apparatus input unit 962 and the second display 961 may be provided in one control panel 9.

The control panel 9 may be provided such that an upper surface is fixed to the front surface (the first front panel) of the first treating apparatus and a lower surface is fixed to the front surface (the second front panel) of the second treating apparatus. In this case, the control panel 9 will serve as a fastening unit for fixing the first treating apparatus T to the second treating apparatus L (serve to fasten the first front panel with the second front panel).

Unlike the aforementioned description, the control panel 9 may be provided to be fixed to any one of the first front panel 11 and the second front panel 51. FIGS. 1 and 3 show that the control panel 9 is fixed to a lower end of the first front panel 11, as an example. That is, a panel accommodating groove formed as the first front panel is bent to be concave is provided on the lower end of the first front panel 11, and the control panel 9 may be fixed to the panel accommodating groove. In this case, the control panel 9 will form the front surface of the first treating apparatus together with the first front panel 11.

Although not shown, if the control panel 9 is provided on the second front panel 51, the control panel 9 is preferably fixed to the panel accommodating groove provided on the upper end of the second front panel 51.

The first display 921 and the first apparatus input unit 922 are controlled by a first display controller 92 provided in the first treating apparatus, and the second display 961 and the second apparatus input unit 962 are controlled by a second display controller 96 provided in the second treating apparatus. The case that the display controller controls the display and input unit means that the display controller and each apparatus are provided to transmit and receive the control signal to and from each other. The first display controller 92 and the second display controller 96 may be provided to be communicated with each other through a communication circuit 98.

The first apparatus input unit 922 may be provided to include a first apparatus first input unit 922a, a first apparatus second input unit 922b, and a first apparatus third input unit 922c. The first apparatus first input unit 922a may be provided as a mechanism for inputting a control command for request of power supply to the first treating apparatus T, and the first apparatus second input unit 922b may be provided as a mechanism for selecting any one of control commands that can be executed by the first treating apparatus, and the first apparatus third input unit 922c may be provided as a mechanism for executing the selected control command or inputting a control command requesting a temporary stop of the control command which is being executed.

The second apparatus input unit 962 may be provided to include a second apparatus first input unit 962a, a second apparatus second input unit 962b, and a second apparatus third input unit 962c. The second apparatus first input unit 962a may be provided as a mechanism for inputting a control command for request of power supply to the first treating apparatus T, and the second apparatus second input unit 962b may be provided as a mechanism for selecting any one of control commands that can be executed by the second treating apparatus, and the second apparatus third input unit 962c may be provided as a mechanism for executing the selected control command or inputting a control command requesting a temporary stop of the control command which is being executed.

Although not shown, the control panel 9 may further be provided with a first apparatus lamp for allowing a user to easily recognize positions of the first apparatus second input unit 922b and the first apparatus third input unit 922c by emitting light, and a second apparatus lamp 962b for easily recognizing positions of the second apparatus second input unit 962b and the second apparatus third input unit 962c by emitting light.

If the first apparatus second input unit 922b and the first apparatus third input unit 922c are provided as buttons provided on the control panel 9, the first apparatus lamp may be provided with a first apparatus first lamp arranged below the first apparatus second input unit 922b inside the control panel 9, and a first apparatus second lamp arranged below the first apparatus third input unit 922c inside the control panel 9. Light emitted from the first apparatus first lamp and the first apparatus second lamp may be emitted to the outside of the control panel through an edge of the first apparatus second input unit and an edge of the first apparatus third input unit.

Meanwhile, if the first apparatus second input unit 922b and the first apparatus third input unit 922c are provided as texts or symbols for allowing a user to recognize a function of each button, light emitted from the first apparatus first lamp and the first apparatus second lamp may be emitted to the outside of the control panel 9 through text or symbol provided in each input unit.

If the second apparatus second input unit 962b and the second apparatus third input unit 962c are provided as buttons provided on the control panel 9, the second apparatus lamp may be provided with a second apparatus first lamp arranged below the second apparatus second input unit 962b inside the control panel 9, and a second apparatus second lamp arranged below the second apparatus third input unit 962c inside the control panel 9. Light emitted from the second apparatus first lamp and the second apparatus second lamp may be emitted to the outside of the control panel through an edge of the second apparatus second input unit and an edge of the second apparatus third input unit.

Meanwhile, if the second apparatus second input unit 962c and the second apparatus third input unit 962c are provided as texts or symbols for allowing a user to recognize a function of each button, light emitted from the second apparatus first lamp and the second apparatus second lamp may be emitted to the outside of the control panel 9 through text or symbol provided in each input unit.

The first motor 31, the fan motor 45, the heat exchanger 47, and the water level sensor 49, which are provided in the first treating apparatus T, are driving load B11 (first driving load) of the first treating apparatus, and the first display 921, the first apparatus second input unit 922b, the first apparatus third input unit 922c and the first apparatus lamp are interface load B12 (first interface load) of the first treating apparatus. Therefore, the first driving load and the first interface load are load (first load portion) of the first treating apparatus.

A power supplied to the first driving load B11 and a control command (driving control command) required for operation may be provided to be controlled by a first load controller 91. Unlike this case, the first interface load B12 may be provided such that power supply is controlled by the first load controller 91 and the driving control command is transmitted from the first display controller 92.

The first treating apparatus T is connected to a power source 99 through a first power line 931, and may be provided such that an alternating current power supplied to the first power line 931 is converted to a direct current power through a first converter 93. In this case, the first display controller 92 may be provided to be supplied with a power through a first apparatus first power circuit 932 connected to the first converter 93, the first load controller 91 may be provided to be supplied with a power through a first apparatus second power circuit 935, and the first driving load B11 and the first interface load B12 may be provided to be supplied with a power through a first apparatus third power circuit 937.

The first apparatus second power circuit 935 may be provided with a first controller switch 936, and the first apparatus third power circuit 937 may be provided with a first load portion switch 938. The first controller switch 936 may be provided to open or close the first apparatus second power circuit 935 in accordance with a control signal of the first display controller 92.

That is, if the first display controller 92 transmits a closing signal through a first controller switch circuit 934, the first controller switch 936 closes the first apparatus second power circuit 935. If the first controller switch 936 closes the first apparatus second power circuit 935, the first load controller 91 may be supplied with a power. However, if the first display controller 92 transmits an opening signal of a circuit through the first controller switch circuit 934, the first controller switch 936 opens the first apparatus second power circuit 935.

The first load portion switch 938 may be provided to open or close the first apparatus third power circuit 937 in accordance with the control signal transmitted from the first load controller 91, or may be provided to open or close the first apparatus third power circuit 937 in accordance with the control signal transmitted from the first display controller 92. FIG. 5 illustrates that the first load portion switch 938 is provided to open or close the first apparatus third power circuit 937 in accordance with the control signal transmitted through the first load portion switch circuit 911, as an example.

The first load portion switch circuit 911 may be provided as a circuit connected to the first controller switch circuit 934 through the first controller switch 936 (FIG. 5), or may be provided as a circuit connecting the first load portion switch 938 with the first load controller 91.

The first display controller 92 and the first apparatus first input unit 922a are always connected with a power source through the first apparatus first power circuit 932. If a user inputs a control command (control command requesting power supply) through the first apparatus first input unit 922a, the first display controller 92 may be provided to close the first controller switch 936 through the first controller switch circuit 934. If the first apparatus second power circuit 935 is closed (if a power is supplied to the first load controller), the first load controller 91 may control the first load portion switch 938 to close the first apparatus third power circuit 937 through the first load portion switch circuit 911.

The first apparatus lamp may be provided to be lighted when the first apparatus second power circuit 935 and the first apparatus third power circuit 937 are closed. That is, when the first display controller 92 closes the first apparatus second power circuit 935 but the first load portion controller 91 opens the first apparatus third power circuit 937, the first apparatus lamp may not be lighted.

Since the first treating apparatus T of the aforementioned structure supplies a power to only the first display controller 92 and the first apparatus first input unit 922a when the first load portions B11 and B12 are not operated, the first treating apparatus T may minimize consumption of a standby power.

The second driving unit 7, the water supply valve 616 and the drainage pump 618, which are provided in the second treating apparatus L, are driving load B21 (second driving load) of the second treating apparatus, and the second display 961, the second apparatus second input unit 962b, the second apparatus third input unit 962c and the second apparatus lamp are interface load B22 (second interface load) of the second treating apparatus. Therefore, the second driving load and the second interface load are load (second load portion) of the second treating apparatus.

A power supplied to the second driving load B21 and a driving control command required for operation may be provided to be controlled by a second load controller 94. Unlike this case, the second interface load B22 may be provided such that power supply is controlled by the second load controller 94 and the driving control command is transmitted from the second display controller 96.

The first treating apparatus T is connected to the power source 99 through a second power line 971, and may be provided such that an alternating current power supplied to the second power line 971 is converted to a direct current power through a second converter 97. The power line 931 of the first treating apparatus T and the power line 971 of the second treating apparatus L are provided separately from each other, whereby even though any one of the two power lines is damaged or any one of the two treating apparatuses is out of order, the other one may be operated.

The second display controller 96 may be provided to be supplied with a power through a second apparatus first power circuit 972 connected to the second converter 97, the second load controller 94 may be provided to be supplied with a power through a second apparatus second power circuit 975, and the second driving load B21 and the second interface load B22 may be provided to be supplied with a power through a second apparatus third power circuit 977.

The second apparatus second power circuit 975 may be provided with a second controller switch 976, and the second apparatus third power circuit 977 may be provided with a second load portion switch 978. The second controller switch 976 may be provided to open or close the second apparatus second power circuit 975 in accordance with a control signal of the second display controller 96.

That is, if the second display controller 96 transmits a closing signal through a second controller switch circuit 974, the second controller switch 976 closes the second apparatus second power circuit 975. If the second controller switch 976 closes the second apparatus second power circuit 975, the second load controller 94 may be supplied with a power.

The second load portion switch 978 may be provided to open or close the second apparatus third power circuit 977 in accordance with the control signal transmitted from the second load controller 94, or may be provided to open or close the second apparatus third power circuit 977 in accordance with the control signal transmitted from the second display controller 96. FIG. 5 illustrates that the second load portion switch 978 is provided to open or close the second apparatus third power circuit 977 in accordance with the control signal transmitted through the second load portion switch circuit 941, as an example.

The second load portion switch circuit 941 may be provided as a circuit connected to the second controller switch circuit 974 through the second controller switch 976, or may be provided as a circuit connecting the second load portion switch 978 with the second load controller 94.

The second display controller 96 and the second apparatus first input unit 962a are always connected with a power source through the second apparatus first power circuit 972. If a user inputs a control command (control command requesting power supply) through the second apparatus first input unit 962a, the second display controller 96 may be provided to close the second controller switch 976 through the second controller switch circuit 974. If the second apparatus second power circuit 975 is closed through the second controller switch 976, the second load controller 94 may control the second load portion switch 978 to close the second apparatus third power circuit 977 through the second load portion switch circuit 941. The second apparatus lamp may be provided to be lighted when the second apparatus second power circuit 975 and the second apparatus third power circuit 977 are closed. That is, when the second apparatus second power circuit 975 is closed but the second apparatus third power circuit 937 is opened, the second apparatus lamp may not be lighted.

Since the second treating apparatus L of the aforementioned structure supplies a power to only the second display controller 96 and the second apparatus first input unit 962a when the second load portions B21 and B22 are not operated, the second treating apparatus L may minimize consumption of a standby power.

Meanwhile, the first display controller 92 may open or close the first apparatus second power circuit 935 in accordance with the control signal transmitted from the second display controller 94 through the communication circuit 98. In this case, the first treating apparatus T is in a standby state (first standby mode step, the state that a power is only supplied to the first display controller and the first apparatus first input unit), the second treating apparatus L is operating, and the second display controller 96 transmits a control command (wake-up signal) to the first display controller 92. If the first treating apparatus T is in a standby mode and the second treating apparatus L is operating, the first apparatus lamp is maintained at a non-lighted state but the second apparatus lamp may be maintained at a lighted state. If the first display controller 92 receives the control signal from the second display controller 96, the first apparatus lamp may be provided to be lighted.

Likewise, the second display controller 96 may open or close the second apparatus second power circuit 975 in accordance with the control signal transmitted from the first display controller 92 through the communication circuit 98. If the second treating apparatus L is in a standby mode and the first treating apparatus T is operating, the second apparatus lamp is maintained at a non-lighted state but the first apparatus lamp may be maintained at a lighted state. In this case, if the second display controller 96 receives the control signal from the first display controller 92, the second apparatus lamp may be provided to be lighted.

Therefore, in a state that one apparatus is operating, the other one apparatus needs to operate, the laundry treating apparatus 100 has an advantage in that one apparatus may initiate operation of the other one apparatus.

Figure 6:
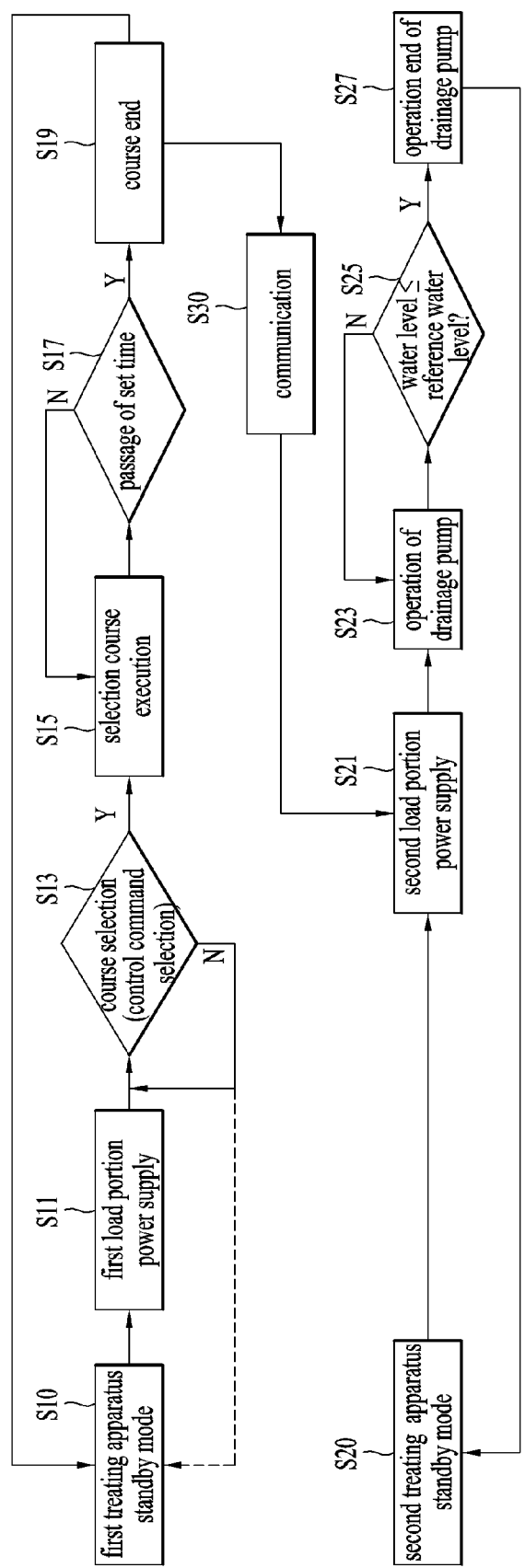
FIG. 6 illustrates an example of a control method for a laundry treating apparatus.

FIG. 6 illustrates an example of a control method for the laundry treating apparatus shown in FIG. 3.

As shown in FIG. 6, if the power is not supplied to the first treating apparatus T and the second treating apparatus L through the first apparatus first input unit 922*a* and the second apparatus first input unit 962*a*, the first treating apparatus and the second treating apparatus respectively perform the first standby mode step S10 and the second standby mode step S20.

The first standby mode step S10 is the step of supplying a power to the first display controller 92 and the first apparatus first input unit 922*a* only, and the second standby mode step S20 is the step of supplying a power to the second display controller 96 and the second apparatus first input unit 962*a* only. At the first standby mode step and the second standby mode step, the first apparatus lamp and the second apparatus lamp are not lighted.

If a signal requesting power supply is input through the first apparatus first input unit 922*a* in the middle of the first standby mode step S10, the control method proceeds to a first power supply step S11 for supplying a power to the first load portions B11 and B12. In this case, the first apparatus lamp is lighted but the second apparatus lamp may be controlled so as not to be lighted.

The first power supply step S11 may be provided to include a step of supplying a power to the first load controller 91 by controlling the first controller switch circuit 934 by the first display controller 92, and a step of supplying a power to the first load portions B11 and B12 by controlling the first load portion switch 938 by the first load controller 91.

If the power is supplied to the first load portion, the control method according to this embodiment proceeds to a step S13 (step of determining whether a selection command of a course and an execution command of a course have been input) of determining whether selection and execution of a control command that may be executed by the first treating apparatus have been requested through the first apparatus second input unit 922*b* and the first apparatus third input unit 922*c*.

If the selection command and the execution command of the course are not input by a user for a preset reference time, the control method may be on standby until the selection command the execution command are input, or may initiate the first standby mode step S10.

Meanwhile, if the control command is input through the first apparatus second input unit 922*b* and the third input unit 922*c*, the control method proceeds to a course execution step S15 of executing the selected course. The course execution step S15 is the step of executing a course selected by a user by controlling the first load portions B11 and B12 by the first load controller 91.

If the first treating apparatus T is provided as a dryer, the course execution step S15 may be provided to include a step of rotating the first drum 21 by controlling the first motor 21 and a step of sequentially executing dehumidification and heating of the air discharged from the first drum by controlling the compressor 473, the pressure controller 474, and the fan motor 45.

The course execution step S15 is performed for a preset time (S17). If the preset time passes, the control method ends the course execution step by interrupting the power supplied to the first load portions B11 and B12 (S19). The course ending step S19 may be provided to include a step of opening the first apparatus third power circuit 937 by the first load controller 91 through the first load portion switch 938.

If the course ending step S19 is completed, the control method according to this embodiment performs a communication step S30 of transmitting a control signal to the second display controller 96 by the first display controller 92.

If the second display controller 96 receives the control signal through the communication circuit 98, the control method performs a second power supply step S21 of supplying a power to the second load portions B21 and B22. In this case, the second apparatus lamp may be lighted.

The second power supply step S21 may be provided to sequentially perform a step of supplying a power to the second load controller 94 by controlling the second controller switch circuit 974 by the second display controller 96 and a step of supplying a power to the second load portions B21 and B22 by controlling the second load portion switch 978 by the second load controller 94.

If the power is supplied to the second load portion, the control method according to this embodiment proceeds to a step S23 of operating the drainage pump 618 provided in the second treating apparatus. The drainage pump operating step S23 (condensed water drainage step) is a process of draining the condensed water generated in the middle of operation of the first treating apparatus T, to the outside of the laundry treating apparatus.

The drainage pump operating step S23 may be performed until a water level of the water collecting body 481 provided in the first treating apparatus reaches a preset reference water level or less (S25). Whether the water level of water collecting body 481 is a reference water level or less may be determined by comparing water level data transmitted from the water level sensor 49 with the reference water level by the first load controller 91. If the water level of the water collecting body 481 is the reference water level or less, the control method proceeds to the second standby mode step S20 after proceeding to a step S27 of ending the operation of the drainage pump.

Meanwhile, the control method may be provided to proceed to the first standby mode step S10 when the operation of the drainage pump ends (S27) or after the course ending step S19 is completed.

Although the control method of FIG. 6 has been described based on that the first treating apparatus first operates and then the second treating apparatus operates, the first treating apparatus may operate after the second treating apparatus operates.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A laundry treating system comprising:
   a first treating apparatus including (i) a first cabinet, (ii) a first container configured to rotate in the first cabinet and receive laundry therein, and (iii) a first driver configured to rotate the first container in accordance with a first control signal of a first load controller;
   a second treating apparatus including (i) a second cabinet having an upper panel that supports the first cabinet, (ii) a second container configured to rotate in the second cabinet and receive laundry therein, and (iii) a second driver configured to rotate the second container in accordance with a second control signal of a second load controller;
   a first display configured to display a first control command for the first treating apparatus;
   a first apparatus input controller configured to input the first control command to the first treating apparatus;
   a first display controller configured to control the first display and the first apparatus input controller;
   a first apparatus first power circuit configured to continuously connect the first display controller and the first apparatus input controller to at least one power source;
   a first apparatus second power circuit configured to selectively connect the at least one power source with the first load controller based on a switching operation by a first controller switch;
   a first apparatus third power circuit configured to selectively connect the at least one power source with the first driver based on a switching operation by a first load portion switch,
   a second display configured to display a second control command for the second treating apparatus;
   a second apparatus input controller configured to input the second control command to the second treating apparatus;
   a second display controller configured to control the second display and the second apparatus input controller;
   a second apparatus first power circuit configured to continuously connect the second display controller and the second apparatus input controller to the at least one power source;
   a second apparatus second power circuit configured to selectively connect the at least one power source with the second load controller based on a switching operation by a second controller switch; and
   a second apparatus third power circuit configured to selectively connect the at least one power source with the second driver based on a switching operation by a second load portion switch,
   wherein the first display controller and the second display controller are configured to communicate with each other, and
   wherein the first display controller is configured to, based on the first display controller receiving the second control command from the second display controller, control the first controller switch to connect the at least one power source with the first load controller.

2. The laundry treating system of claim 1, wherein the second display controller is configured to, based on the second display controller receiving the first control command from the first display controller, control the second controller switch to connect the at least one power source with the second load controller.

3. The laundry treating system of claim 2, wherein the first load controller is configured to, based on the first apparatus second power circuit being connected, control the first load portion switch to connect the at least one power source with the first driver.

4. The laundry treating system of claim 3, wherein the second load controller is configured to, based on the second apparatus second power circuit being connected, control the second load portion switch to connect the at least one power source with the second driver.

5. The laundry treating system of claim 3, wherein the first apparatus input controller is configured to input a first request for power supply to the first driver, and wherein the second apparatus input controller is configured to input a second request for power supply to the second driver.

6. The laundry treating system of claim 5, further comprising a control panel fixed to at least one of the first cabinet or the second cabinet, wherein the control panel includes the first display, the first apparatus input controller, the second display and the second apparatus input controller.

7. The laundry treating system of claim 6, further comprising:
   a first apparatus second input controller positioned at the control panel and configured to receive a control command from a user;
   a first apparatus lamp positioned at the control panel and configured to emit light through the first apparatus second input controller to thereby make a position of the first apparatus second input controller recognizable by the user;
   a second apparatus second input controller positioned at the control panel and configured to receive a control command from the user; and
   a second apparatus lamp positioned at the control panel and configured to emit light through the second apparatus second input controller to thereby make a position of the second apparatus second input controller recognized by the user,
   wherein the first apparatus lamp is configured to be turned on based on the first apparatus second power circuit and the first apparatus third power circuit being closed, and wherein the second apparatus lamp is configured to be turned on based on the second apparatus second power circuit and the second apparatus third power circuit being closed.

8. The laundry treating system of claim 6, wherein the first cabinet further includes a first front panel that defines a first inlet being communicated with the first container,
   wherein the second cabinet further includes a second front panel that defines a second inlet being communicated with the second container, the second front panel facing a same direction as the first front panel, and
   wherein the control panel is fixed to the first front panel.

9. The laundry treating system of claim 8, further comprising a panel accommodating groove that accommodates the control panel that is positioned at a lower end of the first front panel.

10. The laundry treating system of claim 3, wherein the first display is configured to display a first control command input to the first treating apparatus, and wherein the second display is configured to display a second control command input to the second treating apparatus.

* * * * *